United States Patent Office 3,086,938
Patented Apr. 23, 1963

3,086,938
DRILLING MUD REMOVAL
James O. Means and Paul E. Woodward, Jr., Tulsa, Okla., assignors to The Dow Chemical Company, Midland, Mich., a corporation of Delaware
No Drawing. Filed Sept. 2, 1958, Ser. No. 758,547
3 Claims. (Cl. 252—8.55)

The invention pertains to a novel composition and method of use thereof for cleaning residual drilling mud from a wellbore and adjacent portions of the formation traversed thereby.

In drilling wells by the rotary method of drilling, a drilling fluid is usually employed. The drilling fluid is pumped down a string of tubing to which is attached a drill bit. The drill bit is provided with openings above the cutting edge through which the fluid passes outwardly and returns to the surface by way of the annulus formed by the string of drill tubing and the wellbore wall or casing where the well has been provided with a surface casing. The drilling fluid attains a number of ends among which are carried the cuttings of the drill bit to the surface of the ground, plastering the wellbore to prevent sloughing of earthen materials therefrom, and providing a weighting fluid in the wellbore. Upon completion of the well, the drilling fluid is removed from the well by circulation or swabbing. Some of the drilling fluid adheres to the wellbore wall and adjacent formation as a mud sheath and resists removal therefrom. Known methods of removing the mud which adheres to the surface of the well and the adjacent portions of the formation after the well has been completed, include the use of such materials as an acid to which a fluorine compound is sometimes admixed, caustic solutions, hydrocarbons containing an anionic surfactant, and hydrocarbons containing cationic exchange material wherein the cations of the clay are exchanged for those in the exchange material. An example of such cationic material is a long chain reactant such as 1-(2-hydroxyethyl)-2-(8-hepta-decenyl)-2-imidazoline.

There are a number of objections to the use of known materials for the removal of residual mud from wells. The objections to the known methods include the failure of such compositions to adequately suspend the mud to be removed. Such known compositions merely dissolve or partially disintegrate, but do not suspend and therefore do not satisfactorily remove, a large portion of the adhering mud from the completed well. The more successful of the known additaments to oil well treating compositions for the purpose of removing the mud sheaths therefrom have only tended to soften and dislodge the mud sheaths and have failed to hold the mud in suspension so that the mud remained largely in the well. The removal of the adhering mud from completed wells is of great importance before a well is fully completed and ready for production. The inadequacy of known compositions and method of use thereof for this purpose has resulted in a desideratum in the art for such composition and use thereof.

It is, therefore, the principal object of the instant invention to provide a composition and use thereof for removing mud sheaths from a wellbore and adjacent portions of the formation traversed thereby which is more economical and efficient than heretofore known compositions or method of use.

The manner by which this principal object and related objects is attained is made clear in the ensuing description and is particularly pointed out in the appended claims. The invention is predicated upon the discovery that a marked synergistic effect is produced when an organic cationic nitrogenous reagent whose organic radical is exchangeable with the cation of the drilling mud, of the type described in U.S. Patent 2,414,668, and a surfactant selected from the class consisting of anionic and nonionic surfactants are dispersed in a petroleum oil such as kerosene, diesel oil, or crude oil, and the composition thus made brought into contact with residual drilling mud. The composition is introduced into the wellbore, as by pumping down the drill string or tubing and circulating back up the annulus or vice versa thereby carrying out the adhering sheath remaining from the drilling mud. Some of the composition also contacts communicating zones of the formation, disperses adhering mud therein and carries it out suspended therein when the well is put back in production.

The amounts of the cationic reagent and of the anionic or nonionic surfactant employed are usually between 0.5 percent and 4.0 percent of each. More than 4.0 percent of each ingredient may be employed but no apparent advantage can be seen in employing more than this percentage. About 1 part of the cationic reactant and 1 part of the anionic or nonionic surfactant by volume is usually considered sufficient.

The following types of compounds fall within the purview of the cationic nitrogenous reactant employed in the invention:

(1) Alkyl quaternary ammonium halide salts, having the general formula

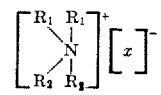

where $R_1$ represents alkyl groups containing between 8 and 18 carbon atoms, $R_2$ is an alkyl group having 1 to 3 carbon atoms, and $x$ is a halide;

(2) Alkyl amines having the general formula $$R-\underset{\underset{R}{|}}{N}-(CH_2)_n-CH_3$$

where R represents hydrogen or an alkyl group of between 1 and 4 carbon atoms and $n$ is an integer between 3 and 17;

(3) Alkyl diamines having the general formula $$R-\underset{\underset{H}{|}}{N}-(CH_2)_n-\underset{\underset{H}{|}}{N}-R$$

where R represents alkyl groups of between 8 and 18 carbon atoms and H, at least one R being an alkyl group, and $n$ is an integer between 3 and 8;

(4) Imidazoline compounds, having the general formula

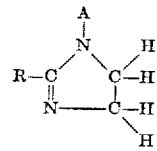

where R is an alkyl group having between 8 and 18 carbon atoms and A is an hydroxyalkyl group containing between 1 and 4 carbon atoms, e.g., 1-(2-hydroxyethyl)-2-(8-heptadecenyl)-2-imidazoline.

The following types of compounds illustrate the types of surfactants which are suitable for the practice of the invention. Among the nonionic surfactants which are suitable are (1) The diethanolamide of coconut oil which is represented by the following general formula

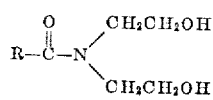

where R represents alkyl groups having 12 to 18 carbon atoms;

(2) The condensation product of one mole of nonyl phenol with four moles of ethylene oxide; and (3) The condensation product of one mole of palmitic acid with 5 moles of ethylene oxide.

Among the anionic surfactants which are suitable for the practice of the invention are (1) Ammonium isopropyl benzene parasulfonate; and
(2) Dioctyl sodium sulfosuccinate.

The oil suitable for the practice of the invention is any hydrocarbon oil, e.g., a petroleum oil such as crude oil, kerosene, fuel oil and diesel oil.

For the purpose of demonstrating the superior mud suspending properties of the composition of the invention over known compositions, a series of tests was run in one group of which only one of either the nitrogenous cationic reagent or the anionic or nonionic surfactant was admixed with kerosene and the resulting mixture admixed with an aqueous bentonite type drilling mud and another group of which both the nitrogenous cationic reagent and either an anionic or nonionic surfactant were admixed in kerosene in accordance with the invention and the resulting mixture admixed with a second portion of the drilling mud. The suspending properties of the compositions were then contrasted.

The drilling mud for use in the tests was prepared by admixing 260 grams of Wyoming bentonite in 3.5 liters of water. To determine the suspending properties of the composition being tested, the percentage by volume of the additaments set out in Table I were admixed with 20 milliliters of the aqueous bentonite drilling mud thus prepared. The results are set out in Table I below:

*Table 1*

[Additament by volume: 100 ml. kerosene containing 20 ml. of drilling mud (composition of mud: 260 grams bentonite in 3.5 liters water)]

| Test No. | Cationic reagent [1] in percent by volume of kerosene | Surfactant [2] in percent by volume of kerosene | Time, hrs. | Effect on suspension of mud |
|---|---|---|---|---|
| 1 | 1 Arquad 2 C | | 0.08 | Settled out. |
| 2 | 2 Arquad 2 C | | 1 | Do. |
| 3 | 2 Duomeen O | | 1 | Do. |
| 4 | 2 Duomeen T | | 1 | Do. |
| 5 | 2 Duomeen C | | 1 | Do. |
| 6 | 2 Duomeen S | | 1 | Do. |
| 7 | 2 Duomeen 12 | | 1 | Do. |
| 8 | 2 Duomeen O dioleate | | 1 | Do. |
| 9 | 2 Duomeen T dioleate | | 1 | Do. |
| 10 | 2 Armeen 218 | | 1 | Do. |
| 11 | 2 Armeen DMSD | | 1 | Do. |
| 12 | 2 Amine O | | 2 | Do. |
| 13 | 2 Amine C | | 2 | Do. |
| 14 | 2 Amine S | | 2 | Do. |
| 15 | 2 Amine 220 | | 4 | Do. |
| 16 | | 2 Alrosol | 0.08 | Do. |
| 17 | | 2 Petrowet R | 0.08 | Do. |
| 18 | | 2 Aerosol OT | 1 | Do. |
| 19 | | 2 Ethofat 142/15 | 0.08 | Do. |
| 20 | | 2 Igepal CO430 | 0.08 | Do. |
| 21 | 1 Arquad 2 C | 1 Alrosol | 24 | Suspended. |
| 22 | 1 Duomeen O | do | 24 | Do. |
| 23 | 1 Duomeen C | do | 24 | Do. |
| 24 | do | do | 24 | Do. |
| 25 | 1 Duomeen T dioleate | do | 24 | Do. |
| 26 | 1 Armeen 218 | do | 24 | Do. |
| 27 | 1 Armeen DMSD | do | 24 | Do. |
| 28 | 1 Amine O | do | 24 | Do. |
| 29 | 1 Amine C | do | 24 | Do. |
| 30 | 1 Amine S | do | 24 | Do. |
| 31 | 1 Amine 220 | do | 24 | Do. |
| 32 | 1 Arquad 2 C | 1 Petrowet R | 24 | Do. |
| 33 | do | 1 Aerosol OT | 24 | Do. |
| 34 | do | 1 Ethofat 142/15 | 24 | Do. |
| 35 | do | 1 Igepal CO430 | 24 | Do. |
| 36 | 1 Duomeen O | 1 Petrowet R | 24 | Do. |
| 37 | do | 1 Petrowet T | 24 | Do. |
| 38 | 1 Armeen DMSD | 1 Petrowet T | 24 | Do. |
| 39 | do | 1 Aerosol OT | 24 | Do. |
| 40 | 1 Amine O | 1 Petrowet R | 24 | Do. |
| 41 | do | 1 Aerosol OT | 24 | Do. |
| 42 | 1 Amine 220 | 1 Petrowet R | 24 | Do. |
| 43 | do | 1 Aerosol OT | 24 | Do. |

An examination of Table I shows that neither the cationic nitrogenous reagent alone nor the anionic or nonionic surfactant alone was effective in preventing the settling of the mud. On the other hand one percent of the cationic reagents and one percent of the surfactant employed together in accordance with the invention produced a synergistic effect which was far beyond any result which could have been anticipated from the cationic reagent or the surfactant alone.

A further series consisting of twenty-eight tests was run to show the effect on mud-suspending properties by varying the ratio of the cationic reagent to the surfactant used. Arquad 2 C and Alrosol were chosen for twelve of the tests and Amine 220 and Alrosol were selected for the other sixteen tests. The results of the tests are set out in Table II. The mud was prepared by admixing 100 milliliters of kerosene and 20 milliliters of the bentonite type drilling mud as in the first series of tests.

A study of the results set out in Table II shows that either 1 percent or 2 percent of the combined volumes of the nitrogenous cationic reagent and the surfactant tested results in 100 percent suspension after 16 hours of standing. It also shows that either one or two percent of a 2:1 ratio of Amine 220 to Alrosol results in 100 percent

[1] The cationic reagents employed may be defined as follows:
Arquad 2C is a mixed difatty alkyl quaternary ammonium chloride having the following general formula

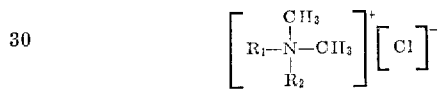

where $R_1$ and $R_2$ consist of the following: 8 percent octyl, 9 percent decyl, 47 percent dodecyl, 18 percent tetradecyl, 8 percent hexadecyl, and 10 percent octadecyl.

Duomeen is a designation applied to a series of N-alkyl-trimethylenediamines having the following general formula $$R-N-CH_2CH_2CH_2-N-H$$
with H on each N wherein R represents groups as follows:
In Duomeen O, R equals the oleyl radical.
In Duomeen T, R equals tall oil derivatives.
In Duomeen C, R equals coconut oil derivatives.
In Duomeen S, R equals soybean oil derivatives.
In Duomeen 12, R is the lauryl radical.
In Duomeen O dioleate, Duomeen O has been reacted to form the dioleate salt thereof. In Duomeen T dioleate, Duomeen T has been reacted to form the dioleate salt thereof.
Armeen 218 is dioctadecylamine.
Armeen DMSD is a dimethyl-soybean oil tertiary amine.
Amine O, C, and S are a series of high molecular weight imidazoline derivatives having the general formula

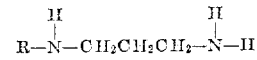

where R is a relatively low molecular weight substituent; n=16 carbon atoms for Amine O which has a molecular weight of about 355, 10 carbon atoms for Amine C which has a molecular weight of about 276, 15 carbon atoms for Amine S which has a molecular weight of about 360.
Amine 220 is 1-(2-hydroxyethyl)-2-(8-heptadecenyl)-2-imidazoline or 2-(8-heptadecenyl)-2-imidazoline-1-ethanol as stated in Vol. 1 of Chemical Abstracts 5th Decenial Index, volumes 41–50, 1947–1950, Subjects, A-Az. "Amine 220" is procurable commercially or may be prepared as described in U.S. Patent 2,267,965 or as briefly set out in Chemical Abstracts 36 (1942), columns 2648[8] and 2649[1].

[2] The surfactants employed may be defined as follows:
Alrosol is a diethylamide of coconut oil; it is nonionic and has the following general formula

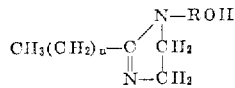

where R is a mixture of alkyl radicals of 12 to 18 carbon atoms with 12 carbon atoms predominating.
Ethofat 142/15 is palmitic acid condensed with 5 moles of ethylene oxide; it is nonionic.
Igepal CO430 is nonylphenol condensed with 4 moles of ethylene oxide; it is nonionic.
Petrowet R is ammonium isopropylbenzene para-sulfonate; it is anionic.
Aerosol OT is dioctylsodiumsulfosuccinate; it is anionic.

Table II

[Additament by volume: 100 ml. kerosene containing 20 ml. of the drilling mud employed in Table I]

| Test No. | Ratio by volume | Percent additament by volume of kerosene | Effect on suspension of mud | |
|---|---|---|---|---|
| | | | 5 min. | 16 hrs. |
| | Arquad 2 C:Alrosol: | | | |
| 44 | 2:1 | 2 | 100 percent in suspension | 80 percent in suspension. |
| 45 | 2:1 | 1 | 30-50 percent in suspension | 30 percent in suspension. |
| 46 | 2:1 | 0.5 | Settled | Settled. |
| 47 | 2:1 | 0.2 | ...do | Do. |
| 48 | 1:1 | 2 | 100 percent in suspension | 100 percent in suspension. |
| 49 | 1:1 | 1 | ...do | Do. |
| 50 | 1:1 | 0.5 | Settled | Settled. |
| 51 | 1:1 | 0.2 | ...do | Do. |
| 52 | 1:2 | 2 | Flocculated | Flocculated. |
| 53 | 1:2 | 1 | ...do | Do. |
| 54 | 1:2 | 0.5 | ...do | Do. |
| 55 | 1:2 | 0.2 | ...do | Do. |
| | Amine 220:Alrosol: | | | |
| 56 | 2:1 | 2 | 100 percent in suspension | 100 percent in suspension. |
| 57 | 2:1 | 1 | ...do | Do. |
| 58 | 2:1 | 0.5 | ...do | 50 percent in suspension. |
| 59 | 2:1 | 0.2 | Settled | Settled. |
| 60 | 1:1 | 2 | 100 percent in suspension | 100 percent in suspension. |
| 61 | 1:1 | 1 | ...do | Do. |
| 62 | 1:1 | 0.5 | ...do | 70 percent in suspension. |
| 63 | 1:1 | 0.2 | Settled | Settled. |
| 64 | 1:2 | 2 | 100 percent in suspension | 100 percent in suspension. |
| 65 | 1:2 | 1 | ...do | Do. |
| 66 | 1:2 | 0.5 | ...do | 40 percent in suspension. |
| 67 | 1:2 | 0.2 | Settled | Settled. |
| 68 | 4:1 | 2 | 100 percent in suspension | 100 percent in suspension. |
| 69 | 4:1 | 0.5 | 75 percent in suspension | 20 percent in suspension. |
| 70 | 1:4 | 2 | 100 percent in suspension | 100 percent in suspension. |
| 71 | 1:4 | 0.5 | 75 percent in suspension | 20 percent in suspension. | suspension after 16 hours but that neither 1 percent nor 2 percent of the combined volumes of a 2:1 ratio of Arquad 2 C to Alrosol results in complete suspension after 16 hours. The results further show that either a 1 percent or 2 percent by volume of the combined volume of a 1:2 ratio of Amine 220 to Alrosol results in 100 percent suspension after 16 hours but when Arquad 2 C is used in place of the Amine 220 in the 1:2 ratio, the mud flocculated.

Another series of tests was run to demonstrate the suspending properties of the composition of the invention on various drilling muds. The composition of the invention employed in this series of tests was a 1:1 by volume ratio of Arquad 2 C:Alrosol in kerosene. The aqueous base drilling mud employed in the tests consisted of 80 milliliters of a mud prepared by dispersing 260 grams of Wyoming bentonite clay in 3.5 liters of water as in the above tests. The tests were run at 80° F.

Table III

| Test No. | Additament, percent by volume in kerosene | Type of mud [1] | Density, lb./gal. | Effect on suspension of mud |
|---|---|---|---|---|
| 72 | 2 | Aqueous base | 8.5 | Mud dispersed easily and remained suspended for 16 hours. |
| 73 | 2 | Hi pH red | 10 | Do. |
| 74 | 2 | LO pH red | 10 | Do. |
| 75 | 2 | ...do | 14 | Do. |
| 76 | 2 | Lime base | 18 | Do. |
| 77 | 2 | Phosphate base | 10 | Do. |
| 78 | 2 | Oil emulsion | 10 | Do. |
| 79 | 1 | Aqueous base | 8.5 | Mud dispersed but settled in approximately 1 hour. |
| 80 | 1 | Hi pH red | 10 | Do. |
| 81 | 1 | LO pH red | 10 | Do. |
| 82 | 1 | ...do | 14 | Do. |
| 83 | 1 | Lime base | 18 | Do. |
| 84 | 1 | Phosphate base | 10 | Do. |
| 85 | 1 | Oil emulsion | 10 | Do. |

A fourth series of tests was run to show the effectiveness of the composition of the invention in suspending solid materials contained in drilling muds at various temperatures. The tests consisted of preparing a composition of the invention by admixing 100 milliliters of kerosene and 20 milliliters of the aqueous base drilling mud described above with 2 milliliters of a 1:1 ratio by volume of Arquad 2 C and Alrosol and observing the effect of

---

[1] The muds employed in Table III may be described as follows:
 (1) Aqueous base: 260 grams of bentonite were dispersed in 3500 milliliters of water and stirred for 30 minutes in a conventional type impeller mixer; this made about 3725 milliliters of the mud.
 (2) High pH red mud was prepared by adding to the aqueous base mud of (1): 30 grams Tannex (a) and 70 milliliters of 15 percent aqueous sodium hydroxide solution, stirring for 15 minutes in an impeller type mixer, and then adding 800 grams of Baroid (b) and stirring an additional five minutes.
 (3) Lo pH mud was prepared by adding to the aqueous base mud above: 4 grams Tannex and 14 milliliters 15 percent aqueous sodium hydroxide solution, stirring 15 minutes in an impeller type mixer and then adding 800 grams of Baroid and stirring an additional 5 minutes.
 (4) LO pH red mud was prepared by adding to the aqueous base mud of (1): 4 grams Tannex and 14 milliliters 15 percent aqueous sodium hydroxide solution, stirring for 15 minutes in an impeller type mixer, and then adding 3700 grams of Baroid and stirring an additional 5 minutes.
 (5) Lime base mud was prepared by adding to the aqueous base mud of (1): 50 grams Tannex, 180 milliliters 15 percent aqueous sodium hydroxide solution and 60 grams calcium hydroxide, stirring for 10 minutes in an impeller type mixer, and adding 30 grams of Impermex (c) thereto, stirring for an additional 15 minutes and thereafter adding 800 grams of Baroid and stirring another 5 minutes.
 (6) Phosphate base mud was prepared by adding to the aqueous base mud of (1): 2.5 grams of Barafos (d) stirring for 15 minutes; then adding 800 grams of Baroid, and stirring for another 5 minutes.
 (7) Low pH emulsion mud was prepared by adding to the aqueous base mud of (1): 50 grams of Hydrocarb (e) stirring 15 minutes, adding thereto 12 percent by volume diesel oil, stirring another 15 minutes, and thereafter adding 1000 grams of Baroid and stirring another five minutes.
 The above terms are trademarks well known in industry and have the following meanings:
  (a) Tannex is a quebracho type thinner.
  (b) Baroid is barium sulfate employed as a weighting agent.
  (c) Impermex is a pregelatinized starch, employed as a fluid loss control agent.
  (d) Barafos is sodium tetraphosphate employed as a thinner.
  (e) Hydrocarb is a caustic lignin compound employed as an emulsifier-thinner.

the Arquad 2 C-Alrosol on keeping the mud in suspension at varying temperatures. The results are set out in Table IV.

Table IV

| Test No. | Temp., °F. | Effect on suspension of mud after 6 hours |
|---|---|---|
| 86 | 80 | Mud completely suspended. |
| 87 | 250 | Do. |
| 88 | 300 | Mud 50 percent suspended. |
| 89 | 400 | Mud partially dispersed but not suspended. |

An examination of the results set out in Table IV shows that the composition of the invention is completely effective from 80° up to and through 250° F. At 300° F., it shows that the effectiveness is definitely lessened and at 400° F. the suspending properties of the composition of the invention have been largely dispelled by the high temperature.

One of the objections to known compositions which have been added to oil-well treating fluids to remove residual mud adhering to the walls of the wellbore and of formation contiguous thereto has been their inability to carry the mud through the pores of the formation. The unhappy experience in the use of such compositions has usually been that the mud was deposited in the pores of the formation and clogged the formation, thereby definitely reducing the permeability thereof.

To demonstrate the ability of the composition of the invention to not only oil-wet the drilling mud components and disperse them but to cause the thus dispersed components to flow through a porous medium, the following series of tests was run: 60 milliliters (91 grams) of 60–80 mesh sand were placed in vertically positioned 5" long open-end glass cylinders having an inside diameter of 1¼". A detachable air line was provided for supplying pressure to the top of the cylinders as desired. A mud-sand slurry was then prepared by admixing 50 milliliters (60 grams) high pH red mud as described above and 120 grams of 60–80 mesh sand. A 22 milliliter portion of this mud-sand slurry was then placed on top of i.e., superimposed on, the 60–80 mesh sand column in the cylinders to produce two strata therein. Graduated glass receivers were placed below the cylinders containing the sand and the superimposed mud-sand strata. Kerosene was forced downwardly through the two-strata columns at a differential pressure of 5 p.s.i. until a constant flow was obtained. The quantity of kerosene required to attain a constant flow varied from 750 to 1000 milliliters. The rate of flow of the kerosene through the strata was measured after a constant rate of flow had been attained. The rates of flow for individual tests are set out in Table V which follows. A negligible amount of the mud was carried into the sand column by the kerosene during these runs as shown by the clearness of the kerosene collected in the graduates below the strata.

Thereafter, between 1 and 5 percent by volume of a 1:1 volume ratio of Arquad 2 C and Alrosol was admixed with a quantity of kerosene in accordance with the invention. Various amounts of the compositions thus made were forced through the vertical columns consisting of the mud-sand stratum superimposed on the sand stratum at the 5 p.s.i. pressure differential employed with the kerosene alone. Following this kerosene was forced downwardly through the two strata at 5 p.s.i. until a constant flow was attained. The results are set out in Table V, wherein the percent increase in the flow rate of kerosene after treatment with the compostiion of the invention compared to the flow rate before treatment is calculated.

When the composition of the invention was thus employed, a substantial portion of the mud of the mud-sand stratum was carried through the lower sand stratum into the graduate below as shown by its high mud content. The permeability of the sand remained high as evidenced by the large amount of the composition of the invention which passed through the sand during the tests.

Table V shows the results of the tests wherein from 50 to 500 milliliters of either kerosene or the composition of the invention were employed.

The results of Table V shows that the rate of flow through the sand was definitely greater wherein the kerosene contained the Arquad 2 C-Alrosol in accordance with the invention than for kerosene alone.

Table V

| Test No. | Percent additament based on kerosene by volume | Volume of composition of invention passed through sand | Volume of additament added to kerosene | Flow rate of kerosene in ml. per second | | Percent increase of flow |
|---|---|---|---|---|---|---|
| | | | | Before composition of invention added | After composition of invention added | |
| 90 | 1 | 50 | 0.5 | 0.590 | 0.89 | 48 |
| 91 | 1 | 100 | 1.0 | 0.49 | 0.91 | 86 |
| 92 | 1 | 150 | 1.5 | 0.556 | 1.250 | 125 |
| 93 | 1 | 200 | 2.0 | 0.430 | 1.000 | 136 |
| 94 | 1 | 250 | 2.5 | 0.425 | 1.11 | 161 |
| 95 | 1 | 500 | 5.0 | 0.590 | 1.670 | 183 |
| 96 | 2 | 50 | 1.0 | 0.44 | 0.91 | 107 |
| 97 | 2 | 100 | 2.0 | 0.445 | 1.11 | 150 |
| 98 | 2 | 150 | 3.0 | 0.530 | 1.33 | 151 |
| 99 | 2 | 200 | 4.0 | 0.420 | 1.11 | 164 |
| 100 | 2 | 250 | 5.0 | 0.59 | 1.670 | 183 |
| 101 | 2 | 500 | 10.0 | 0.666 | 1.670 | 150 |
| 102 | 5 | 50 | 2.5 | 0.425 | 1.11 | 162 |
| 103 | 5 | 100 | 5.0 | 0.370 | 1.05 | 184 |
| 104 | 5 | 150 | 7.5 | 0.77 | 2.00 | 158 |
| 105 | 5 | 200 | 10.0 | 0.80 | 2.00 | 150 |
| 106 | 5 | 250 | 12.5 | 0.479 | 1.183 | 147 |
| 107 | 5 | 500 | 25.0 | 0.375 | 0.908 | 146 |

The rate of flow through the sand is highly significant. The high rate of flow of the composition of the invention carrying with it the mud of the superimposed mud-sand stratum shows that the composition of the invention not only loosens and suspends mud particles interlocked with sand particles but carries them at a relatively low pressure differential through an adjacent sand stratum to a place of recovery beyond. Therefore, in treating a well in accordance with the invention, mud, dislodged and carried into adjacent producing strata (when the composition of the invention was injected into the well) would, upon reversing the direction of flow as by putting the well back in production, be carried through the strata into the wellbore and removed therefrom with the first oil being produced, after treatment. If the mud were carried into non-producing strata remote from the wellbore, it would tend to remain there and would not cause impediment to production from the oil sands.

Below is set forth an example of the practice of the invention in an oil well. A new well was completed in the Strawn sand formation of Texas. Five feet of the casing opposite the Strawn sand, 3119 feet to 3124 feet, were perforated. The annular volume between the casing and the tubing was 34 barrels, that of the tubing was 11 barrels. The borehole was charged with crude oil. Twenty gallons of the 1:1 by volume ratio of Arquad 2 C and Alrosol were admixed with 1000 gallons of crude oil to form approximately 24 barrels of the composition of the invention. This volume of composition was then pumped down the tubing of the well and forced upwardly through the annulus between the casing and the tubing. This composition was then followed by 12 barrels of crude oil as a flush. At this point all the composition of the invention had been forced up the casing above the perforations. The tubing was then closed and pressure applied to the casing by pumping 24 barrels of crude oil down the casing thus reversing the direction of the movement of fluids in the well and thereby forcing the composition of the invention out the perforations and into the formation. The well was then put back into production. The treating composition of the invention was thereby flowed back into the wellbore and out of the well. It carried large quantities of mud with it. The following production figures show the effectiveness of the mud removal from the well in accordance with the invention. Prior to treatment according to the invention, the well was producing 10.44 barrels of oil per day and no water. The first day following treatment, it produced 48.72 barrels of oil per day and ½ barrel of water. At the end of 6 days after the treatment, the well was producing 18.56 barrels of oil and 1.16 barrels of water per day. The preceding example shows that the removal of the mud sheath from the borehole and the adjacent portions of the formation greatly increased the production of the well.

A second example was performed in accordance with the invention. A new well had just been drilled in Washington County, Colorado, in the D Sand, Magic Creek Pool. This well had been damaged because of lost circulation which had resulted in the loss of a large quantity of mud into the formation. The well was treated with 1000 gallons of the composition of the invention consisting of 2 percent of a 1:1 by volume ratio of Arquad 2 C and Alrosol in crude oil produced from the formation. Before the treatment the well was producing 21 barrels of oil per day. Seven days after the treatment, the well was producing 65 barrels of oil per day along with approximately 30 barrels per day of drilling fluid and basic sediment. The mud was gradually thereby removed from the well and thereafter the well produced at an appreciable higher rate of production than had existed prior to the treatment.

Having described the invention, what is claimed and desired to be protected by Letters Patent is:

1. A method of removing residual drilling mud from a wellbore and the portions of the formation immediately adjacent thereto consisting of injecting down the wellbore and into contact with said residual drilling mud the composition consisting essentially of an admixture of (1) a hydrocarbon oil; (2) a cationic nitrogenous component selected from the class consisting of (a) an alkyl quaternary ammonium halide salt having the general formula:

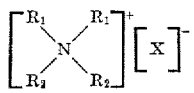

wherein $R_1$ is an alkyl substituent containing between 8 and 18 carbon atoms, $R_2$ is an alkyl group containing between 1 and 3 carbon atoms, and X is a halide; (b) alkyl amines having the general formula:

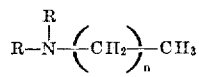

wherein R represents an alkyl group of between 1 and 4 carbon atoms and $n$ is an integer of between 3 and 17; (c) alkyl diamines having the general formula:

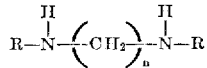

wherein R represents alkyl groups of between 8 and 18 carbon atoms and H, at least one R being an alkyl group, and $n$ is an integer between 3 and 8; (d) imidazoline compounds, having the general formula:

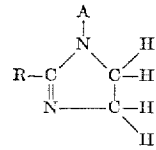

wherein R is an alkyl group containing between 8 and 18 carbon atoms and A is an hydroxylalkyl group containing between 1 and 4 carbon atoms; and (3) a surfactant selected from the class consisting of (a) the diethanolamide of coconut oil which is represented by the following general formula

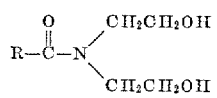

where R represents alkyl groups having 12 to 18 carbon atoms; (b) the condensation product of one mole of nonylphenol with four moles of ethylene oxide; (c) the condensation product of one mole of palmitic acid with five moles of ethylene oxide; (d) ammonium isopropyl benzene parasulfonate; and (e) dioctyl sodium sulfosuccinate; said cationic nitrogenous component, identified as (2), and said surfactant identified as (3) each being present in an amount of at least about 0.5% by volume of said hydrocarbon oil, identified as (1).

2. The method of removing residual drilling mud and clay particles according to claim 1, wherein the cationic nitrogenous reactant is a dimethyl dialkyl quaternary ammonium chloride wherein the alkyl radical consists of about 8 percent octyl, 9 percent decyl, 47 percent dodecyl, 18 percent tetradecyl, 8 percent hexadecyl, and about 10 percent octadecyl by weight.

3. The method of removing residual drilling mud and clay particles from a wellbore and the face of a formation traversed by the wellbore in accordance with claim 1 wherein the surfactant is the diethanolamide of coconut oil.

References Cited in the file of this patent

UNITED STATES PATENTS

| | | |
|---|---|---|
| 2,342,424 | Newton et al. | Feb. 22, 1944 |
| 2,356,205 | Blair et al. | Aug. 22, 1944 |
| 2,414,668 | Ratcliffe | Jan. 21, 1947 |
| 2,580,765 | Hall et al. | Jan. 1, 1952 |
| 2,602,778 | Snyder et al. | July 8, 1952 |
| 2,779,418 | Garst | Jan. 29, 1957 |
| 2,800,862 | Garst | July 30, 1957 |

UNITED STATES PATENT OFFICE
CERTIFICATE OF CORRECTION

Patent No. 3,086,938 April 23, 1963

James O. Means et al.

It is hereby certified that error appears in the above numbered patent requiring correction and that the said Letters Patent should read as corrected below.

Column 10, line 35, for "(2), and said surfactant identified as (3) each being" read -- 2. The method of removing residual drilling mud and --.

Signed and sealed this 31st day of March 1964.

(SEAL)
Attest:
ERNEST W. SWIDER

EDWARD J. BRENNER

Attesting Officer

Commissioner of Patents